Jan. 29, 1924. 1,482,271
J. N. SIMMS
DINNER PAIL
Filed April 25, 1921 2 Sheets-Sheet 2
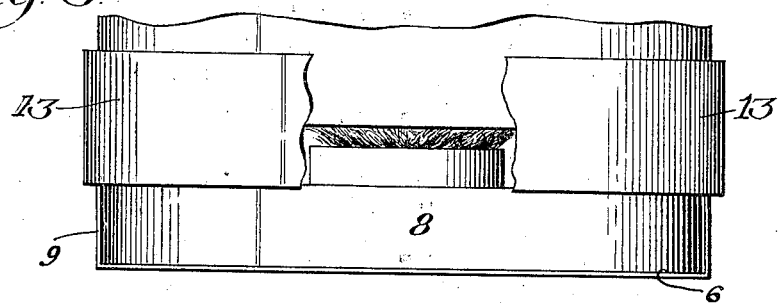
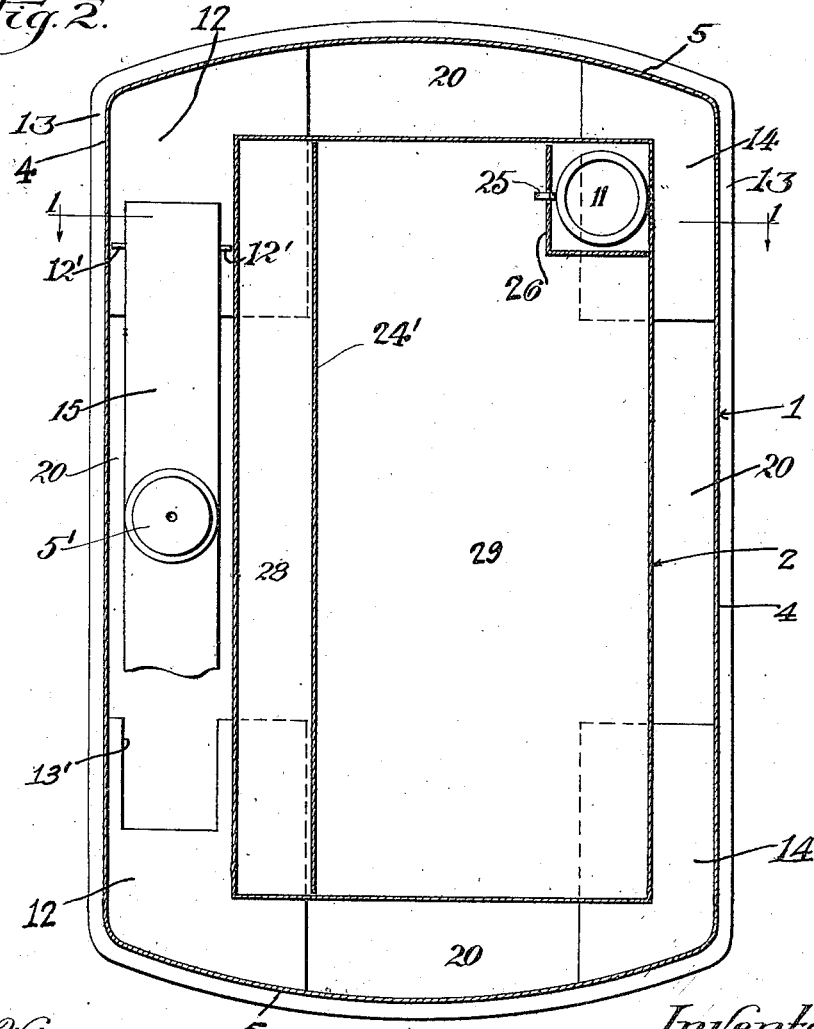
Witness:
Inventor:
James N Simms Patented Jan. 29, 1924.

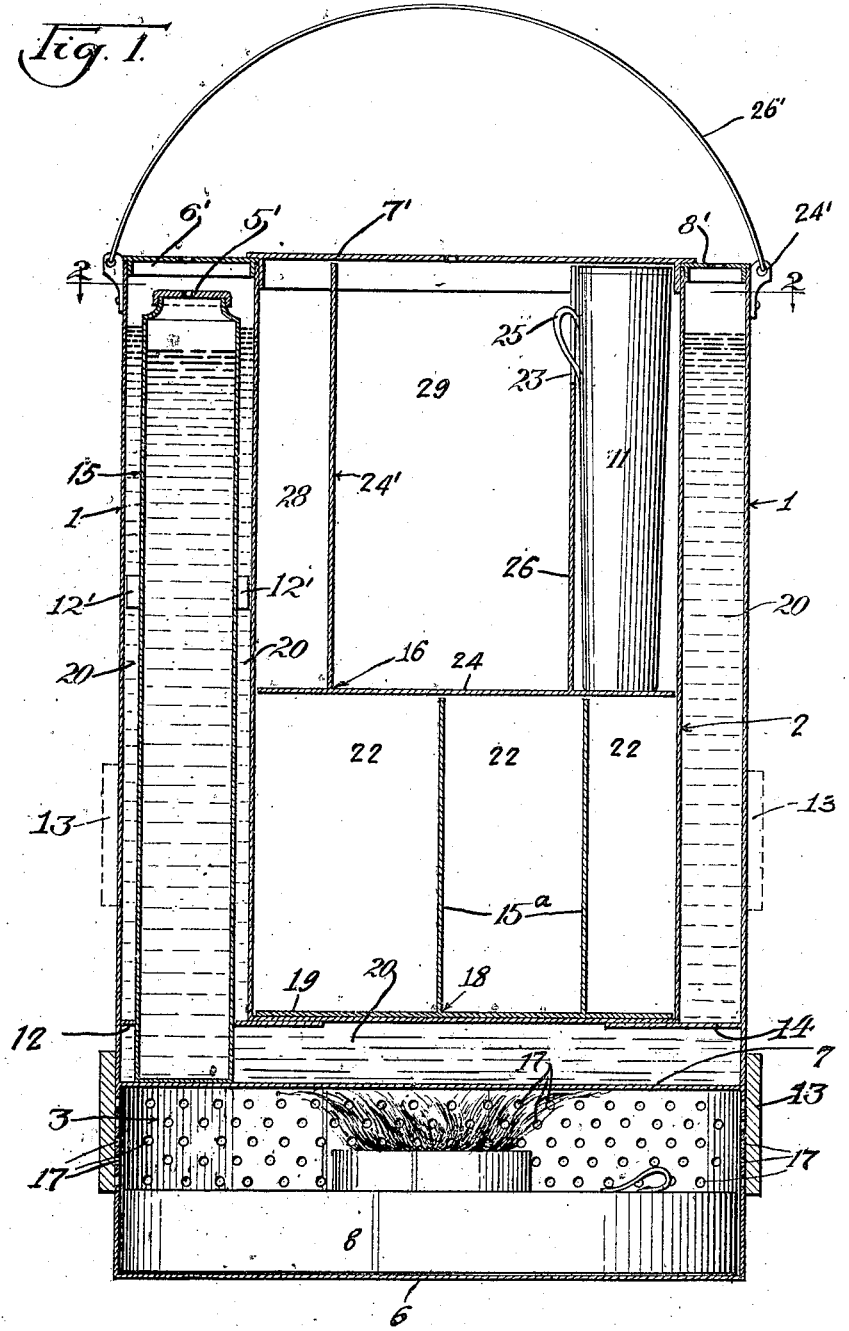

1,482,271

UNITED STATES PATENT OFFICE.

JAMES N. SIMMS, OF CHICAGO, ILLINOIS.

DINNER PAIL.

Application filed April 25, 1921. Serial No. 464,312.

*To all whom it may concern:*

Be it known that I, JAMES N. SIMMS, a citizen of the United States, residing at Chicago, in the county of Cook and the State of Illinois, have invented new and useful Improvements in Dinner Pails, of which the following is a specification.

This invention relates to new and useful improvements in dinner pails, and has for its object the provision of a device of the character stated which shall include means for warming or cooking the contents thereof, which shall embody a construction adapted to be readily disassembled to facilitate the cleaning thereof whereby it may be maintained in a highly sanitary condition at all times, and which while strong, durable and efficient in use, may be manufactured and sold at a comparatively low cost.

With these and other objects in view, the invention consists in certain novel features of construction, combination and arrangement of parts described in the specification and shown in the accompanying drawings, wherein:

Figure 1 is a vertical sectional view of the entire pail, the view being taken on the line 1—1 of Figure 2;

Figure 2 is a sectional view on the line 2—2 of Figure 1 looking in the direction indicated by the arrows, and Figure 3 is a view in elevation showing the lower part of the pail, parts being broken away.

Referring in detail to the drawings, the device comprises essentially a body 1, a receptacle 2 supported within and spaced from the walls of the body, and a heating chamber 3 formed in the bottom of the body. The body 1 has pivoted as at 24' a bail 26' by means of which the pail is carried in the usual manner.

The body 1 is made of metal and may be of any preferred cross section, but is shown as being substantially rectangular. The body includes side and end walls 4 and 5, respectively, and a bottom 6 above which is positioned the partition plate 7 supported by the said walls. The partition 7 with the bottom 6 and the lower part of the walls 4 and 5 provides a heating chamber 3 in which is positioned a heater 8 of any suitable construction.

As shown, the heating chamber 3 is provided with an opening 9 to permit of the ready insertion and removal of the heater 8.

As best shown in Figure 1, the vertical walls of the chamber 3 are perforated to provide ventilator openings 17 which permit of a sufficient quantity of air reaching the burner to insure the proper combustion of the burner fuel. Surrounding the body 1 is a collar 13 which is adapted to be moved vertically to cover or uncover the ventilator openings. When the heater is ignited, the collar is raised to the position shown in dotted lines in Figure 1 and when the burner is not in use, the collar is lowered to cover the ventilator openings. The collar when in lowered position serves to prevent the burner 8 from becoming lost as by sliding out of the chamber 3 through the opening 9.

Positioned above the partition 7 and extending inward from the corners formed by the juncture of the side and end walls 4 and 5, are the supports 12 and 14. The supports 12 are provided with cut-out portions 13' adapted to engage the side walls of a coffee, tea or like receptacle 15 and to assist in maintaining the same spaced from the adjacent side 4 of the body of the pail. The receptacle 15 is also spaced from the wall of the receptacle 2 and a wall 4 of the body 1 by means of projections 12' carried by the side walls of the container.

Positioned within the body 1 and spaced from the walls thereof is the receptacle 2 which is also preferably rectangular in cross section and which is supported by the plates 12 and 14. The receptacle 2 is divided into compartments by a member 18 consisting of a base plate 19 resting on the bottom of the receptacle 2 and carrying upstanding partition plates 15ª which divide the lower part of the food receptacle into a series of food compartments 22. Resting on the upper edges of the partition plates 15ª is a partition member 16 which comprises a base plate 24 and an upstanding partition plate 24' extending longitudinally thereof. The plate 24' forms compartments 28 and 29, the compartment 28 being adapted to receive sugar, salt or other spice containers together with eating implements such as knives, forks and the like. The base plate 24 also carries an upstanding angled member 26 forming a compartment for a cup 11, in one corner of the receptacle 2. As shown, one side of the angled member 26 is provided with a slot 23 to receive the handle 25 of the cup 11. The large compartment 29 may be used to carry food.

The space between the body 1 and the receptacle 2 provides a water reservoir 20. The water becomes heated by contact with the partition 7 which is heated by the flame of the burner 8 and the water becoming of a temperature greater than that of the food in the compartments 22 and 29, the food in these compartments is warmed by heat transmitted by the walls of the compartments. Also, the coffee, tea or the like contained in the receptacle 15 will become heated through a like process.

The water reservoir 20 is provided with cover members 6' and 8' and the food receptacle 2 is provided with a cover 7'. Each of the cover sections is provided with a vent opening to permit the escape of steam generated when the burner is ignited. The screw cap 5' of the liquid container 15 is also provided with a vent opening as shown. As will be understood from an inspection of the drawings, the covers 6' and 8' serve to keep the walls of the receptacle 2 spaced from the walls of the body 1.

Having thus described my invention, what I claim is:

1. A device of the class described comprising a body, a heating chamber formed in the bottom of said body, pairs of supporting plates within said body and spaced above said heating chamber, one pair of said supporting plates having cut away portions to receive a liquid container and to laterally support the same, and a food container resting on said supporting plates.

2. A device of the class described comprising a body, a heating chamber formed in the bottom of said body, pairs of supporting plates within said body and spaced above said heating chamber, one pair of said supporting plates having cut away portions to receive a liquid container and to laterally support the same, and a food container resting on said supporting plates, and said food container having removable partitioning means positioned therein.

3. A device of the class described comprising a body, a receptacle positioned within said body and spaced from the side walls thereof, partitioning means within said receptacle, said partitioning means comprising base plates carrying upstanding partition plates, one of said upstanding partition plates being formed from an angle member and having a slot adapted to receive the handle of a cup, a heating compartment formed in the bottom of said body below said receptacle, and a heater in said compartment.

4. A device of the class described comprising a body, a receptacle within said body and spaced from the walls thereof, upper and lower partitioning means within said receptacle, said upper partitioning means resting on said lower partitioning means and carrying an angled member forming a cup receptacle in said food receptacle, a heating chamber formed in the lower part of said body, and a heater in said chamber.

JAMES N. SIMMS.